United States Patent [19]

Kobayashi et al.

[11] Patent Number: 5,347,759
[45] Date of Patent: Sep. 20, 1994

[54] DOOR LOWER MOLDING

[75] Inventors: Masao Kobayashi; Koichi Ogiso; Shinichi Goto; Haruyasu Mizutani; Masaomi Goto; Hiroshi Iwasaki, all of Inazawa, Japan

[73] Assignee: Toyoda Gosei Co., Ltd., Nishikasugai, Japan

[21] Appl. No.: 40,359

[22] Filed: Mar. 30, 1993

[30] Foreign Application Priority Data

Apr. 23, 1992 [JP] Japan .................. 4-103294
Apr. 23, 1992 [JP] Japan .................. 4-103295

[51] Int. Cl.⁵ .................................... E06B 7/16
[52] U.S. Cl. ........................ 49/496.1; 49/475.1; 49/490.1
[58] Field of Search ............ 49/496.1, 490.1, 475.1, 49/478.1

[56] References Cited

U.S. PATENT DOCUMENTS

| 4,370,832 | 2/1983 | Koike | 49/496.1 X |
| 4,926,600 | 5/1990 | Mesnel | 49/496.1 X |
| 4,937,126 | 6/1990 | Jackson | 49/490.1 X |
| 5,207,029 | 5/1993 | Nozaki et al. | 49/490.1 X |

FOREIGN PATENT DOCUMENTS 2290755 11/1990 Japan .

Primary Examiner—Philip C. Kannan
Attorney, Agent, or Firm—Cushman, Darby & Cushman

[57] ABSTRACT

A door lower molding that has a main body molded of a synthetic resin by extrusion. The main body is fixed along a lower end of a door of a vehicle. The main body has a seal lip extended thereon, which closely contacts a rocker molding of the vehicle body when the door is closed. A core made of a synthetic resin is embedded in the main body. The seal lip may be covered on its outer side with a skin which has a flaw resistance characteristic and on its inner side with a sealing layer including silicone to prevent freeze-sticking to the vehicle body.

6 Claims, 4 Drawing Sheets

DOOR LOWER MOLDING

BACKGROUND OF THE INVENTION

1. Field of the Invention

This invention relates to a door lower molding, particularly to a door lower molding that is fixed along a lower edge of a door of a vehicle so as to shut off a gap between the door and a car body.

2. Description of Related Art

FIG. 4 shows such a door lower molding. This door lower molding is a surface-mounting type which is secured directly to the door.

FIG. 4 is a cross sectional view of the door lower molding. In this figure, the left side illustrates the inside of the car and the right side illustrates the outside of, the car.

As shown in the figure, the door lower molding 51 has a main body 52 which is disposed along a lower edge of a door D. The main body 52 is fixed by screws (not shown) or an adhesive double coated tape with an upper portion closely contacted to an inner surface of the door D. The main body 52 is made by extruding a polyvinyl chloride resin (PVC). A lower portion thereof has a reversed L-section that is bent toward a cabin space of the car. An insert 53 is embedded into the lower portion along its full length for a reinforcement. The insert 53 is made of a stainless steel into the reversed L-section. The insert 53 has both of its lateral ends folded in order to improve its strength or binding force with the main body 52. A shoulder 54 is projected from an outside of the lower portion of the main body 52 along its full length. The shoulder 54 touches the lower end of the door D from below so as to position the main body 52 to the door D.

A seal lip 55 slants downward from the lower part of the main body 52 for its full length.

When the door D is closed, as shown by a two-dot chain line, the seal lip 55 is warped and has an inner surface of its leading end closely contacted with a rocker molding R which is arranged at the body B side of the car. Thus, the seal lip 55 shuts a gap between the door D and the rocker molding R, thereby blocking intrusion of mud or dust into the cabin space, shielding road noise, preventing clothes of passengers from becoming dirty during ingress and egress, etc.

The door lower molding 51 weighs too much since the main body 52 is embedded with the stainless steel insert 53. Therefore, it is not suitable for achieving the lighter car weight that has been requested especially in recent years.

In manufacturing, molding 51 needs a bending step for each end of the insert 53, a coating and drying step of an adhesive on the bended insert 53, etc. Thus, it requires many production steps. Also, it is necessary to add equipment for bending both ends of the insert 53. Consequently, production costs may be unreasonably high.

Since the door lower molding 51, being fixed on the lower end of the door D, is in a position very close to the road, it is inevitable that small stones or the like are rolled up and hit the outside thereof while the car is running. Accordingly, scratches or flaws may soon be made on the molding, thereby affecting its appearance, even if the main body 52 is molded of the PVC that has a comparatively good resistance to such damages.

SUMMARY OF THE INVENTION

In view of the above, it is an object of the invention to provide a door lower molding that has a lighter weight so as to decrease the weight of a vehicle.

It is another object of the invention to provide a door lower molding that decreases the number of manufacturing steps and the amount of production equipment, thereby diminishing production costs.

In accordance with one preferred mode of the invention, there is provided a door lower molding that has a main body which is fixed on a lower end of a door of a vehicle and formed of a synthetic resin material. A seal lip is extended from the main body so that it closely touches the vehicle body when the door is closed. A formed of a synthetic resin material is embedded into the main body.

In accordance with another preferred mode of the invention, there is provided a door lower molding that has a main body which is fixed on a lower end of a door of a vehicle and which has a core embedded thereinto. The main body is formed of a synthetic resin material. A seal lip is extended from the main body so that it closely touches the vehicle body when the door is closed. A skin covers part of the seal lip that would otherwise be exposed to the outdoors. The skin is formed of an elastomer.

Further objects and advantages of the invention will be apparent from the following description, reference being made to the accompanying drawings, wherein preferred embodiments of the invention are clearly shown.

DETAILED DESCRIPTION OF THE PREFERRED EMBODIMENTS

Figure 1:
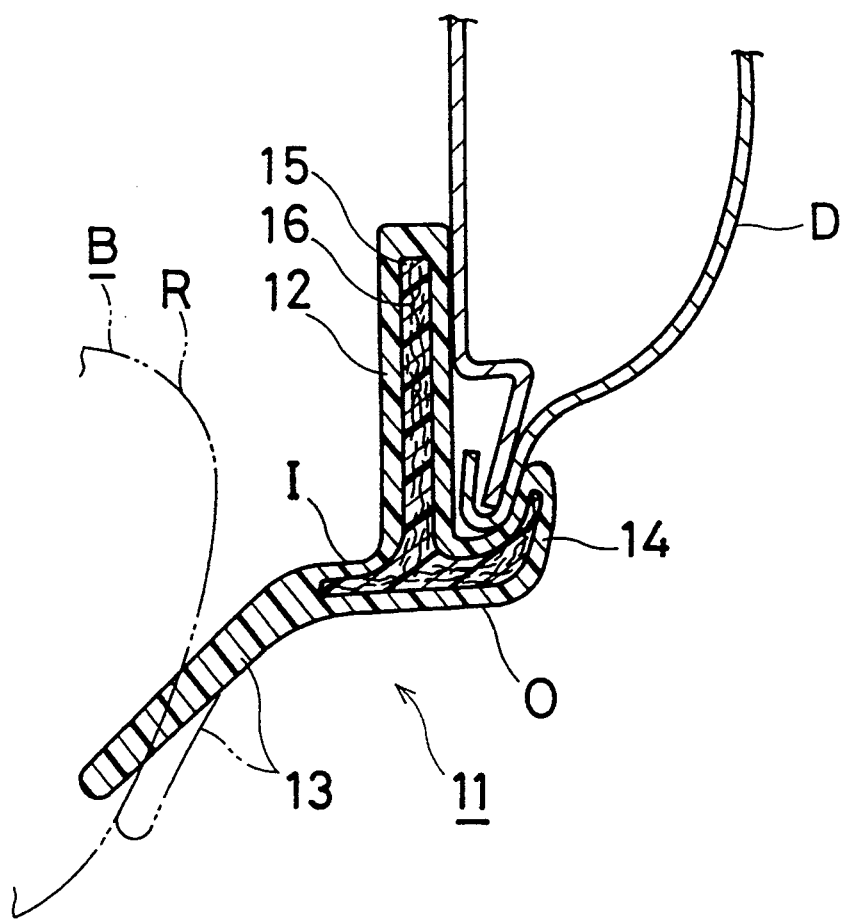
FIG. 1 is a cross sectional view showing a first embodiment of a door lower molding of the invention.

In the drawings, wherein like reference characters designate like or corresponding parts throughout the several views, several illustrated preferred modes of a door lower molding of the invention are described hereafter.

FIG. 1 illustrates a section of the first embodiment of a door lower molding. In this figure, the left side illustrates the inside of a car and the right side illustrates the outside of the car.

As shown in the figure, the door lower molding 11 has a main body 12 which is formed of a styrene ethylene butadiene styrene copolymer (SEBS) by extrusion. The main body 12 is fixed on the lower end of the door D by screws (not shown) or an adhesive double coated tape as in the conventional door lower molding 51 of FIG. 4. A lower portion of the main body 12 is branched or forked into an inside part I and an outside part O. The main body 12 has an inverted T-section as a whole. A seal lip 13 extends slantwise downward from the inside fork I for its full length. When the door D is closed, as shown by a two-dot chain line, the seal lip 13 is bent back and the inner surface of its leading end closely contacts with a rocker molding R which is disposed at the body B side of the car. Thus, the seal lip 13 shuts a gap between the door D and the rocker molding R, thereby blocking intrusion of mud or dust into the cabin space, shielding road noise, preventing the clothes of passengers from becoming dirty when getting in and out of the car, etc. In the present embodiment, a compression set of the main body 12 is fixed in a range of forty to forty-five percent and a hardness thereof is fixed in a range of sixty to ninety (JISA).

A hook 14 extends for its full length slantwise upward from the outside fork O of the lower portion of the main body 12. The hook 14 touches closely the outer surface of the lower end of the door D so as to prevent the main body 12 from moving inwardly of the door. A core 15 is embedded into the main body 12 for its full length. The core 15 is made of a mixture 16 of a polypropylene resin (PP) mixed with glass fibers. A lower portion of the core 15 is forked into an inside part and an outside part. The outside fork thereof is elongated slantly upward along the hook 14. Namely, the core 15 has an inverted T-section corresponding to the main body 12 as a whole, except for seal lip 13, and acts as a reinforcer of the main body 12.

In the present embodiment, the glass fibers mixed in the core 15 are selected among ones which have a coefficient of linear expansion of $1.0 \times 10^{-5}/C$, a bending elasticity of $9 \times 10^4 kgf/cm^2$, and a fiber length of about 10 to 20 mm, which is comparatively long. A mixing ratio of the glass fibers and the polypropylene resin is set in the range of 40 to 50:50 to 40 parts by weight. As a result of mixing the glass fibers, the coefficient of linear expansion of the core 15 is much smaller than that of the polypropylene resin itself, namely approximately $2.5-4.0 \times 10^{-5}/C$, that is about the same as a linear expansion coefficient of metals like stainless steel or the like.

Figure 4:
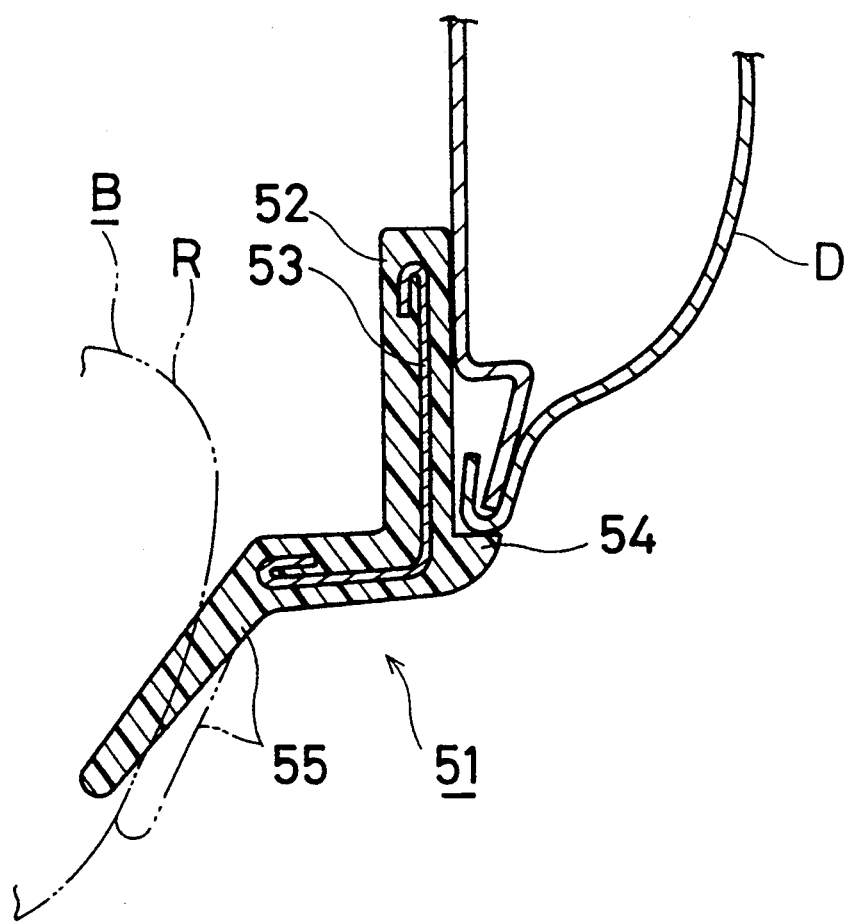
FIG. 4 is a cross sectional view of a conventional door lower molding.

Comparing a specific gravity of the door lower molding 11 with a specific gravity of the conventional door lower molding 51 of FIG. 4, the stainless insert 53 of the molding 51 has a specific gravity of 7.9 and the PVC main body 52 has a specific gravity of 1.3. On the other hand, the glass fiber mixed PP core 15 of the molding 11 has a specific gravity of 1.1-1.5 (dependent on mixing ratio) and the SEBS main body 12 has a specific gravity of 0.9. That is, the first embodiment of the door lower molding 11 replaces the stainless insert 53 with the synthetic resin core 15 which is by far lighter than the insert 53. Moreover, the main body 12 uses a synthetic resin material that is lighter than that of the PVC of the prior art. Consequently, the molding 11 is much lighter than the prior art molding of the same shape and size.

As mentioned above, the whole weight of the present embodiment of the door lower molding 11 is decreased very much, thereby contributing to a lighter weight car, since the main body 12 and the core 15 are both made of synthetic resins.

Moreover, in manufacturing the molding 11, the core 15 can be formed at the same time with extruding the main body 12, so that it is not necessary at all to perform the bending step of the insert 53, as well as the coating and drying step of the adhesive beforehand, as in the conventional molding 51 of FIG. 4. Therefore, it is possible to reduce the number of manufacturing steps and largely diminish production costs.

Furthermore, the synthetic resin core 15 is very much easier to form in a desired shape, or the core 15 can be made in a most suitable shape according to a shape of the main body 12. As a result, it is possible to reinforce the molding 11 very reliably and increase its strength.

In addition, it is possible to eliminate the step of removing the metal insert 53 in the conventional molding 41 in case of recycling it after scrapping, since the whole molding 11 is made of synthetic resins. Thus, recycling work can be much simplified thereby improving recycling efficiency.

On the other hand, in case an external force is applied to the molding 11 from outside, the hook 14 prevents beforehand the molding 11 from deformation against the external force, since the hook 14 closely contacts the outer surface of the door D to prevent the main body 12 from moving inwardly of the door as described above. If the molding 11 is given an excessive external force beyond a regulating force of the hook 14 or an external force from inside of the car, the molding 11 will be deformed. However, even if the molding 11 is deformed, the core 15 has sufficient elasticity so that there is no fear at all that it is plastically deformed, contrary to the stainless insert 53. The molding 11 surely returns to its original shape by elastic force of the core 15 and the main body 12. Thus, the molding 11 always performs its sealing function without fail.

Mixture 16 in core 15 contains glass fibers to the extend required to have about the same linear expansion coefficient as metals such as a stainless steel, so that it restrains the main body 12 from transformation, though the main body 12 of synthetic resin has a much larger linear expansion coefficient. Thus, the molding 11 expands and contracts as a whole in substantially the same manner as metals like a stainless steel, according to temperature change. Therefore, if the molding is fixed on the door D of the car by screws or adhesive double coated tape, the molding 11 expands and contracts due to temperature change in the same manner as the metal door D. As a result, the molding 11 is prevented from generating a stress due to differences of expansion, and is free from various disadvantages such as warping thereof and peeling off of the adhesive double coated tape.

While the main body 12 is made of the SEBS by extrusion and has the hook 14 extended therefrom in the illustrated first embodiment, its material or shape is not limited as long as it is molded of a synthetic resin. Accordingly, it is possible to change its material or omit the hook 14. It is preferable to use a polyolefine resin or a polystyrene resin as the material, which has a lighter specific gravity than the PVC used for the main body 52 of FIG. 4, for the purpose of facilitating the lighter weight of molding 11.

While the core 15 is made of a polypropylene resin mixed with the glass fibers in the first embodiment, its material or shape is not limited as long as it is molded of a synthetic resin. Accordingly, it may be formed only by a polypropylene resin without any glass fibers 16 mixed. It is preferable to use a material of small specific gravity as its material such as the above mentioned polyolefine resin or polystyrene resin, in addition to the polypropylene resin, for the purpose of facilitating a lighter weight for molding 11.

While the core 15 is made of the polypropylene resin mixed with the glass fibers of linear expansion coefficient of $1.0 \times 10^{-5}/C$, bending elasticity of $9 \times 10^4 kgf/cm^2$ end fiber length of about 10–20 mm, and the mixing ratio of the glass fibers 16 and the polypropylene resin is fixed between 40–50:50–40 parts by weight, in the first embodiment, alternatively, core 15 may be otherwise structured as long as it has a similar linear expansion coefficient to metals and uses a glass fibers mix. Accordingly, the glass fibers may be ones which have another linear expansion coefficient or bending elasticity. Fillers like mica or talc may be mixed in the core 15 together with the glass fibers, in order to get the linear expansion coefficient of the core 15 similar to metals.

Figure 2:
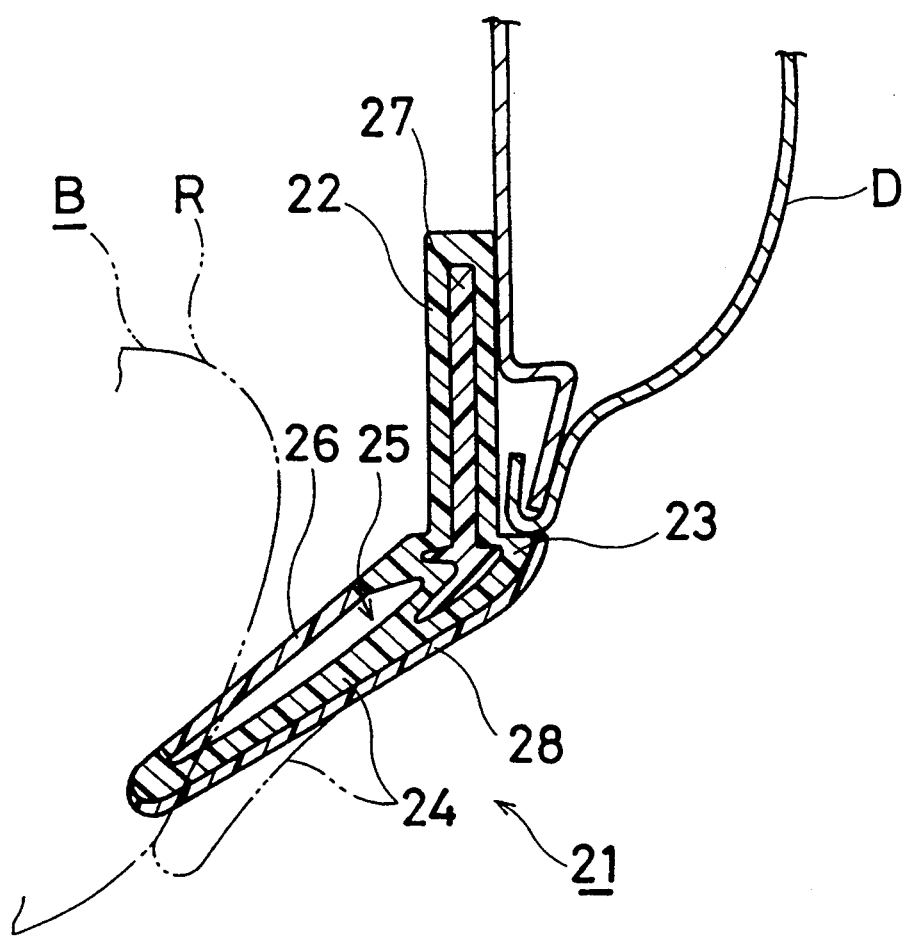
FIG. 2 is a cross sectional view of a second embodiment of door lower molding of the invention.

FIG. 2 illustrates a section of the second embodiment of a door lower molding. In this figure as in FIG. 1, the left side illustrates the inside of a car and the right side illustrates the outside of the car.

As shown in the figure, the door lower molding 21 has a main body 22 which is formed by extrusion of the same material (SEBS) as the first embodiment. The main body 22 is fixed on the lower end of the door D by screws (not shown) or an adhesive double coated tape as in the door lower molding 51 of FIG. 4. The full length of shoulder 23 projects from an outside of the lower portion of the main body 22, thereby positioning the main body 22 to the door D. A seal lip 24 extends slantwise downward from the lower part of the main body 22 for its full length.

The seal lip 24 has a longitudinally extending cavity 25 of an elongate cross section formed inside for a full length of lip 24. An inner elastic portion 26 is defined as a portion of the seal lip 24 near the cabin space. The elastic portion 26 contains a larger amount of a nitrile butadiene rubber (NBR) than the other portion of the main body 22 so as to have a rich elasticity.

When the door D is closed, as shown by a two-dot chain line, the seal lip 24 is bent back with the inner surface of its leading end closely contacting a rocker molding R of the body B side of the car. At this time, the inner elastic portion 26 of the seal lip 24, which is positioned at the cabin side, is stretched and made longer, so that the seal lip 24 is urged toward the body B by an elastic force of the elastic portion 26 so as to perform its sealing function better.

A core 27 of a polypropylene resin is embedded into the main body 22 for its full length. The core 27 has its lower portion formed into an angle section so as to avoid the cavity 25. The core 27 reinforces the main body 22 except the seal lip 24. All portions of the main body 22 which could be exposed to the outside of the car, that is all the outer surface of the seal lip 24, is covered with a skin 28 which has a predetermined layer thickness and is made of a vinyl chloride elastomer. Accordingly, only the skin 28 is exposed to the outside of the car.

The skin 28 of the molding 21 is inevitably hit by small stones or the like when the car is driven, since the molding 21 is disposed at the lower end of the door D or in a position very near to the road. However, skin 28 is made of a soft vinyl chloride elastomer and has a very high flaw resistance, so that it is prevented from flaws or scars beforehand. As a result, the molding 21 is free from flaws or scars if the small stones or the like hit it while the car is running, thus maintaining a good appearance for a long time. A very small amount of the vinyl chloride elastomer is necessary, since it is used only for the skin 28. Hence, if the elastomer is comparatively expensive, it never becomes a cost increase factor. Moreover, the manufacturing steps of the molding 21 are not increased due to the addition of skin 28, since the skin can be molded simultaneously with extruding the main body 22.

On the other hand, as the door D of the car is closed for a longer time than open, the seal lip 24 is kept in a warped state as shown by a two-dot chain line for a long time. Therefore, if the elasticity of the seal lip 24 is poor, the seal lip 24 produces compression set thereby decreasing its sealing capability. However, in the second embodiment, the elastic portion 26 acting as a sealer has a rich elasticity because it contains a higher amount of NBR, so that there does not take place any compression set mentioned above. Thus, it is always possible for the leading end of the seal lip 24 to contact the rocker molding R closely. The elastic portion 26 is free to expand and contract independently without any interference of the outer portion of the seal lip 24 which has a lower elasticity, since it is separated from the outer portion by cavity 25. Therefore, it is possible to utilize the maximum elastic force for the sealing function of the seal lip 24. As a result, the leading end of the seal lip 24 surely contacts the rocker molding R, thereby always carrying out perfectly the sealing function.

As well known, in case content of the NBR is augmented, an appearance of the surface of the product and the weather resistance are worsened. However, the elastic portion 26 is not exposed to the outside but positioned inside the car, so that there is no possibility that its appearance or its weather resistance is affected. Namely, the molding 21 is prevented in advance from worsening the appearance and the weather resistance. As the elastic portion 26 can be molded at the same time with extruding the main body 22 like the skin 28, there is no increase in the number of manufacturing steps for the molding 21 resulting from portion 26 being elastic. Thus, it is possible to restrain cost increases.

Figure 3:
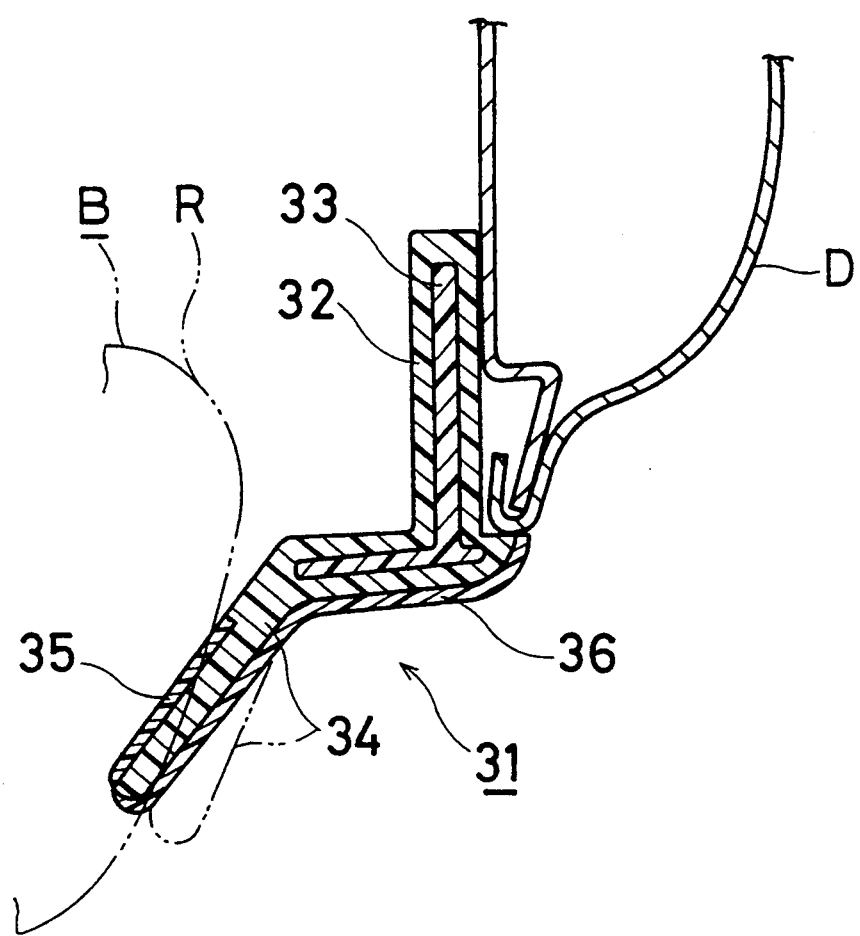
FIG. 3 is a cross sectional view of a third embodiment of a door lower molding of the invention.

FIG. 3 illustrates a section of the third embodiment of a door lower molding. The present embodiment of the molding has a similar construction to the second embodiment of the molding 21. So it will be explained specially laying emphasis on different points therefrom.

As shown in the figure, the door lower molding 31 has a main body 32 which is formed of SEBS by extrusion. A core 33 of a PP resin is embedded into the main body 32. A seal lip 34 extends slantwise downward from a lower portion of the main body 32 for its full length. A sealing layer 35 of a fixed thickness is formed on a surface of the seal lip 34 near the cabin space, namely the surface closely contacting the rocker molding R of the body B. A predetermined amount of a silicone is contained in the PP resin of the sealing layer 35. All molding portions, which would otherwise be exposed to the outside of the car, of the molding 31 are covered with a skin 36 made of a vinyl chloride elastomer and having a fixed layer thickness.

The molding 31 constructed as above is prevented beforehand from flaws or scars by small stones or the like hitting it while the car is driven, since skin 36 is made of a soft vinyl chloride elastomer, as is molding 21 of the second embodiment. Thus, the molding 31 keeps a good appearance for a long time.

When the door D is closed, as shown by a two-dot chain line, the sealing layer 35 of the seal lip 34 closely contacts the rocker molding R of the body B side of the car so as to perform its sealing function. When used in a cold place, moisture between the seal lip 34 and the rocker molding R frequently freezes to cause members 34 and R to stick to each Other. However, since the sealing layer 35 contains silicone as mentioned above, it can be easily peeled off from the rocker molding R if frozen and stuck thereto. As a result, it is possible to open the door D with a lighter handling force and improving more the function of the molding 31.

As the skin 36 and the sealing layer 35 can be molded at the same time with extruding the main body 32, there is no fear at all that the number of manufacturing steps for the molding 31 increases due to the above mentioned measure. Thus, it is possible to restrain increase of costs.

This invention may be practiced or embodied in still other ways without departing from the spirit and essential character thereof. For instance, while the invention has been described in relation to surface-mounting type door lower moldings 11, 21, and 31 in the first to third embodiments, it may be alternatively be embodied in other forms as long as it is fixed along the lower end of the door D and shuts off the gap between the door D and the body B. Accordingly, the present invention can be used with a clip-type door lower molding that is fixed on the door via fittings like clips, for example.

While the second and third embodiments of the moldings 21 and 31 are molded of SEBS by extrusion, they may alternatively be formed in another shape and of another material as long as they are made of a synthetic resin material. Accordingly, the material may be changed into a polyolefine resin or a polystyrene resin.

While the second and third embodiment cores 27 and 33 are made of a PP resin, they may alternatively be formed of another material or into another shape as long as they are embedded into the main body 22, 32 and can reinforce it. Accordingly, they can be metal inserts like stainless steel, for example.

While the second and third embodiments of the skins 28 and 36 are made of a vinyl chloride elastomer, they may alternatively be of another material characteristic, as long as it is soft and gives them a flaw resistance characteristic. Accordingly, the material may be changed into a polystyrene elastomer or a polyolefine elastomer.

While, in the second embodiment, the seal lip 24 has the cavity 25 formed therein and the elastic portion 26 of high content of NBR provided near the cabin space, so as to prevent reduction of the sealing function thereof, the cavity 25 may be omitted as long as the sealing function is sufficiently given by the elastic portion 26 alone. Moreover, it is possible to heighten the elasticity of the elastic portion 26 by mixing other rubber materials than the NBR.

While, in the third embodiment, the sealing layer 35 formed near the cabin space of the seal lip 34 contains silicone so as to cope with freezing between the rocker molding R and the seal lip 34, the sealing layer 35 may alternatively be given a freeze-proof function by mixing other materials than silicone, for example.

The preferred embodiments described herein are therefore illustrative and not restrictive, the scope of the invention being indicated in the appended claims, and all variations which come within the meaning of the claims are intended to be embraced therein.

What is claimed is:

1. A door lower molding for a vehicle door, comprising:
   a main body made of synthetic resin and adapted to be fixed along a lower end of a door of a vehicle;
   a seal lip extending from an end of the main body for closely contacting a body of said vehicle when the door is closed;
   a core made at least partially of a synthetic resin embedded longitudinally in the main body; and
   a hook extending from the main body for closely contacting an outer surface of the lower end of the door;
   wherein the core has a cross section corresponding to a cross section of the main body and extends into the hook.

2. A door lower molding according to claim 1, wherein the core is made of a mixture of long glass fibers and the synthetic resin of said core.

3. A door lower molding according to claim 2, wherein the glass fibers of the core are long fibers of linear expansion coefficient of $1.0 \times 10^{-5}/C$, bending elasticity of $9 \times 10^4 \, kgf/cm^2$ and fiber length of about 10 to 20 mm, and the synthetic resin of the core is a polypropylene resin, while a mixing ratio of the glass fibers and the polypropylene resin is fixed between 40 to 50:50 to 40 parts by weight.

4. A door lower molding for a vehicle door, comprising:
   a main body made of a synthetic resin and adapted to be fixed along a lower end of a door of a vehicle, the main body having a core embedded longitudinally thereof;
   a seal lip extending from an end of the main body for closely contacting a body of said vehicle when the door is closed; and
   a skin of an elastomer covering a portion of the seal lip that otherwise would be exposed to an outside of the vehicle;
   wherein the seal lip has a cavity extending therein for the full length of said lip, an inner portion of said lip having a higher elasticity than an outer portion of said lip.

5. A door lower molding according to claim 4, further comprising a sealing layer formed on an inner surface of the seal lip for preventing freezing between the seal lip and a rocker molding of said vehicle.

6. A door lower molding according to claim 5, wherein the sealing layer is made of a polypropylene resin containing a silicone.

* * * * *